(12) United States Patent
Liebhold et al.

(10) Patent No.: US 7,734,140 B2
(45) Date of Patent: Jun. 8, 2010

(54) VIDEO PROCESSING APPARATUS WHICH CAN RESPOND TO NON-NATIVE REMOTE COMMANDS AND METHOD OF OPERATION THEREOF

(75) Inventors: Valerie Sacrez Liebhold, Carmel, IN (US); Mark Gilmore Mears, Zionsville, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1452 days.

(21) Appl. No.: 10/512,328

(22) PCT Filed: Apr. 17, 2003

(86) PCT No.: PCT/US03/11991

§ 371 (c)(1),
(2), (4) Date: Oct. 22, 2004

(87) PCT Pub. No.: WO03/090224

PCT Pub. Date: Oct. 30, 2003

(65) Prior Publication Data

US 2006/0080706 A1  Apr. 13, 2006

Related U.S. Application Data

(60) Provisional application No. 60/374,539, filed on Apr. 22, 2002.

(51) Int. Cl.
*H04N 5/765* (2006.01)
(52) U.S. Cl. .......................... 386/46; 348/734
(58) Field of Classification Search ............ 386/46, 386/83; 380/242; 348/734
See application file for complete search history.

(56) References Cited

U.S. PATENT DOCUMENTS 5,297,204 A * 3/1994 Levine ................ 380/242

(Continued)

FOREIGN PATENT DOCUMENTS

EP  0930781  7/1999

(Continued)

OTHER PUBLICATIONS

Search Report Dated July 31, 2003.

(Continued)

*Primary Examiner*—Huy T Nguyen
(74) *Attorney, Agent, or Firm*—Robert D. Shedd; Joseph J. Opalach; Reitseng Lin

(57) ABSTRACT

A recorder, method, device, and interpretation apparatus for executing code commands. The invention is a device which functions in response to code commands comprising: means to execute a function in response to a code command having a format for the device; and means to execute the function in response to a code command having a format for a different device. The invention is also a recorder comprising means to execute a first type of recorder function corresponding to a second type of recorder commands. In another aspect, the invention is a method of controlling a recorder comprising: receiving a second type of recorder command; mapping the second type of recorder command into a corresponding first type of recorder function; and executing the corresponding first type of recorder function. In yet another aspect, the invention is an interpretation apparatus for receiving a second type of recorder command and outputting a corresponding first type of recorder.

7 Claims, 3 Drawing Sheets

U.S. PATENT DOCUMENTS

| | | | |
|---|---|---|---|
| 6,844,900 B2 * | 1/2005 | Yuen | 348/734 |
| 2002/0035404 A1 | 3/2002 | Ficco et al. | |

FOREIGN PATENT DOCUMENTS

| | | |
|---|---|---|
| JP | 5308392 A | 11/1993 |
| JP | 2000152155 A | 5/2000 |
| KR | 1999-23262 A | 3/1999 |
| WO | WO 02/19691 | 3/2002 |

OTHER PUBLICATIONS

Malaysian Search Report dated May 27, 2009 citing corresponding EP application, EP B1-1 497 827.

* cited by examiner

VIDEO PROCESSING APPARATUS WHICH CAN RESPOND TO NON-NATIVE REMOTE COMMANDS AND METHOD OF OPERATION THEREOF

CROSS-REFERENCE TO RELATED APPLICATIONS

This application claims the benefit, under 35 U.S.C. § 365 of International Application PCT/US03/11991, filed Apr. 17, 2003, which was published in accordance with PCT Article 21(2) on Oct. 30, 2003 in English and which claims the benefit of U.S. Provisional Patent Application No. 60/374,539, filed Apr. 22, 2002.

TECHNICAL FIELD OF THE INVENTION

This invention generally relates to the field of devices which function in response to user commands.

BACKGROUND ART

Devices which function in response to code commands are very well known, for example televisions, VCRs, CD players, DVD recorders, personal video recorders, cable boxes, to name but a few types. In most types of devices, the code commands are organized so as to have a prefix which indicates the type of device being controlled, i.e., VCR or DVD or STB, for example. Systems that receive broadcast signals and generate a display signal for a television set are known as set-top boxes ("STB"), whether they are actually on top of a television set or any other location outside or within the television set itself. Set-top boxes are currently available for receiving digital satellite television broadcast, cable television broadcast, community antenna service, dial up, cable, or DSL Internet service, or combinations thereof.

An STB is any electronic device designed to produce output on a conventional television set, having one or more inputs connected to a communications channel such as telephone, ISDN, optical fiber, or cable. STB's usually allow the user to interact with the programs shown on the television in some way. Many STB's offer on-screen program guides, known as electronic program guides ("EPG"), that allow the user to perform many program related functions, such as program searching, parental controls, and program recording. Control of external devices such as VCR's, DVD players, personal video recorders and television sets, for example, is also possible. Typically, a user interacts with the STB via an infrared ("IR") remote control or manually entering commands via buttons on the STB.

Many STB's having EPG's allow a user to select a show from the STB's EPG and record it to a VCR by sending a one-touch record command to the STB. In response to receiving the one-touch record command, the STB sends a VCR IR code record signal via an IR blaster to the VCR. The VCR IR code signal is received and executed by the VCR. At the end of the program, the STB usually sends a stop recording VCR IR code command to the VCR via the IR blaster. The VCR then responds accordingly.

When an owner of such an STB decides to upgrade from an analog VCR to a digital recorder, such as a personal video recorder ("PVR") or a digital versatile disc player ("DVD") player, such an STB is not capable of communicating with the digital recorder. If available, an upgraded owner must use a satellite and cable guide that is built into the digital recorder to perform program recordings. Some digital recorders may not offer a guide with satellite or other EPG information. The user will not be able to use the EPG of the STB to send record commands to the digital recorder because the digital recorder answers only to IR codes with a digital recorder identity. The identity of a code command is delineated by that code's prefix/preamble. STB's that were designed at a time when digital recorders were not available will not be able to communicate with the digital recorder because they can only produce code commands with a VCR identity/preamble.

Thus, a need exists for a personal video recorder that can understand various IR codes types, such as VCR IR codes and digital recorder IR codes. A need also exists for an apparatus that can receive a first type of IR code from an STB, convert the first type of IR code to a second type of IR code, and send the second type of IR code to a recording device that can execute the second type of IR code.

DISCLOSURE OF THE INVENTION

These needs, and others which will become apparent from the following disclosure and drawings, are addressed by the present invention which in one aspect is a video processing apparatus such as a digital video recorder apparatus controllable by its own user commands (the first type of user commands) but also by user commands (the second type of user commands) of a different type of video processing apparatus such as a VCR. The video processing apparatus includes a receiver (the receiving means) for receiving both types of user commands, and a processing unit (the executing means) for executing one of a plurality of functions provided by the video processing apparatus upon receiving a corresponding user command of the second type.

The execution means can be a command interpreter for mapping the second type of user commands into corresponding functions provided by the video processing apparatus. Alternatively, the execution means can be a properly programmed processor. It is preferred that the second type of user commands is VCR code commands while the video processing apparatus is a digital recorder.

When the video processing apparatus is a digital recorder, the video recorder of the present invention can be used to execute a number of video recorder functions, such as turn on digital recorder, start recording, start playing, stop recording and playing, and turn off digital recorder. In this embodiment, the second type of user commands will be VCR turn on unit, VCR record, VCR play, VCR stop, and VCR turn off unit. The video recorder can be a digital recorder selected from the group consisting of a personal video recorder or a DVD player while the different type of video processing apparatus can be a VCR.

In another aspect, the invention is a method of controlling a recorder apparatus comprising: receiving a second type of recorder command; mapping the second type of recorder command into a corresponding first type of recorder function; and executing the corresponding first type of recorder function. It is preferred that the second type of recorder command is a VCR code command and the first type of recorder function is a digital recorder function.

In yet another aspect, the invention is an interpretation apparatus for receiving a second type of video recorder command and outputting a corresponding first type of video recorder command comprising: a receiver adapted to receive the second type of video recorder command; means to map the second type of video recorder command into a corresponding first type of video recorder command; and means to output the corresponding first type of video recorder command. The interpretation apparatus is a stand alone device that is operably positioned between the STB and the video recorder apparatus. As with the other embodiments of the invention, it is preferred that the second type of video recorder command be VCR code command and the first type of video recorder command be a digital recorder code command, such as DVD player or personal video recorder command. The receiver can comprise an IR sensor, and the output means can be an IR blaster, a serial pin output, or a microjack. The mapping means can be a programmed processor or a command interpreter.

In still another aspect, the invention is a device which functions in response to code commands comprising: means to execute a function in response to a code command having a format for the device; and means to execute the function in response to a code command having a format for a different device. In this aspect, the code command having a format for the device will preferably have a first preamble and the code command having a format the different device will preferably have a second preamble. The first preamble can be a VCR preamble and the second preamble can be a digital recorder preamble.

The recorder apparatus, the interpretation apparatus, and the device of the present invention are all adapted to "learn" various commands, such as record, play, etc., from a VCR and also "learn" various corresponding commands of a digital recorder. As used herein, "learn" means that the apparatus will capture the IR code and analyze its important components, e.g. carrier frequency, length, etc., so that it can recognize in the future when it receives a particular command from a particular device. When it does recognize the command, it emits the equivalent digital recorder command. Thus, when the apparatus receives a VCR command, it can emit the corresponding digital recorder command.

MODES FOR CARRYING OUT THE INVENTION

Figure 1:
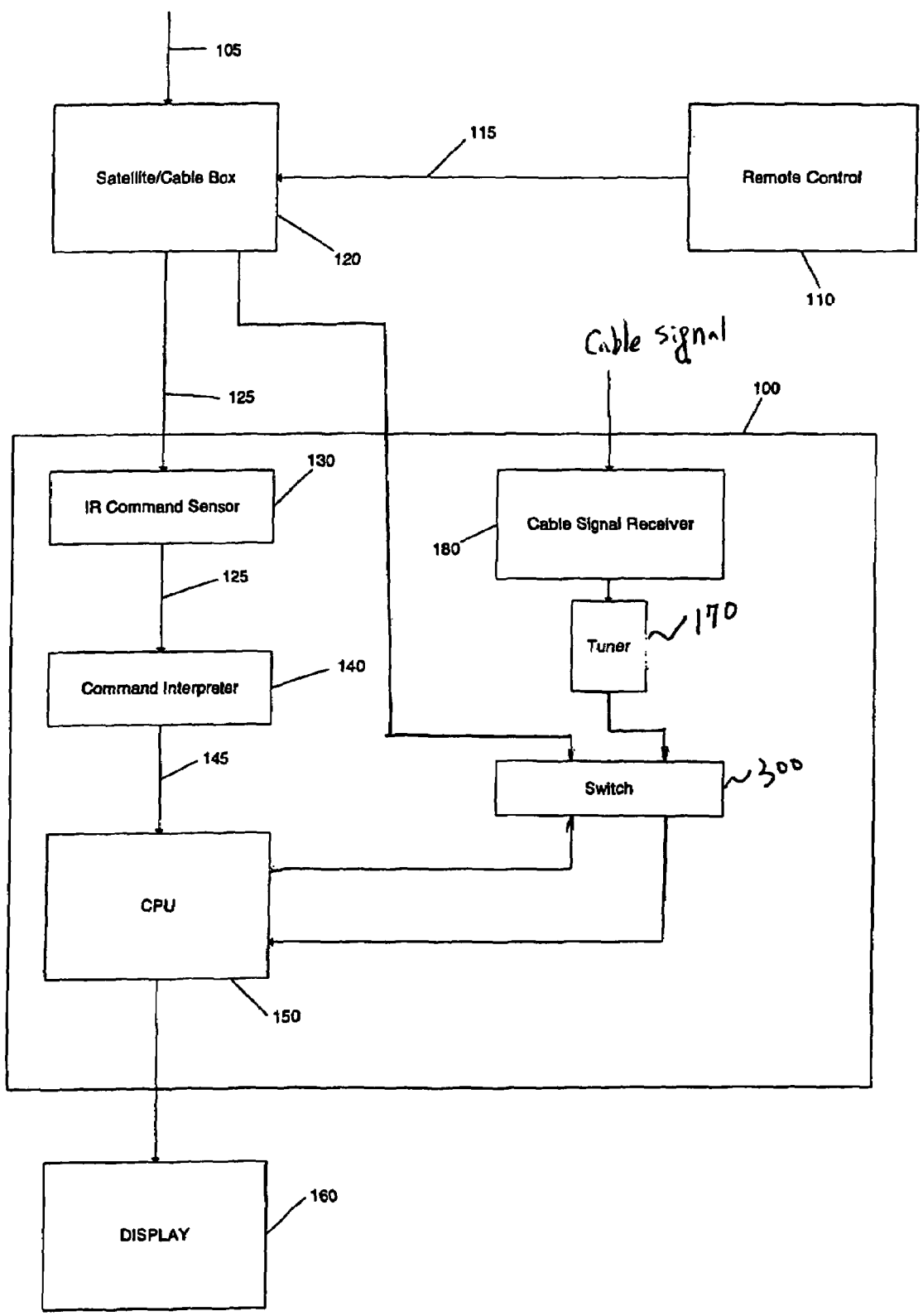
FIG. 1 is a block diagram of a recorder according to the invention.

Referring to FIG. 1, digital video recorder 100 is illustrated according to the present invention. Digital video recorder 100 comprises IR command sensor 130, command interpreter 140, computer processing unit ("CPU") 150, tuner 170, switch 300, and cable signal receiver 180. All of the components of digital video recorder 100 are linked via a bus and controlled by CPU 150 according to standards known in the art. Digital video recorder 100 is operably coupled to display 160 and satellite/cable box ("SCB") 120. The functions of digital video recorder 100 operate according to digital recorder code commands. Digital recorder code commands can be a DVD code commands or any other type of digital code commands. Display 160 can be any type of display module capable of producing images, such as a television or computer monitor. The digital video recorder 100 receives video signals from two sources: one directly from a cable network and the other from SCB 120. A user should instruct the digital video recorder 100 which one of the two sources for receiving video signals. When the source is directly from a cable network, a user should also instruct the digital video recorder 100 the channel information, so that the digital video recorder 100 can tune to that channel. Specifically, the cable signal receiver 180 receives cable signals directly from a cable network and the tuner 170 tunes to the channel as specified by the user to receive video signals. The video signals are then fed to the switch 300, which selects the video signals from the tuner 170 as its output, as instructed by the CPU 150 using methods known in the art. When a user instructs the digital video recorder 100 to receive video signals from the SCB 120, the video signals are fed to the switch 300 directly, and the CPU 150 directs the switch 300 to select the video signals from the SCB 120 as its output.

Figure 2:
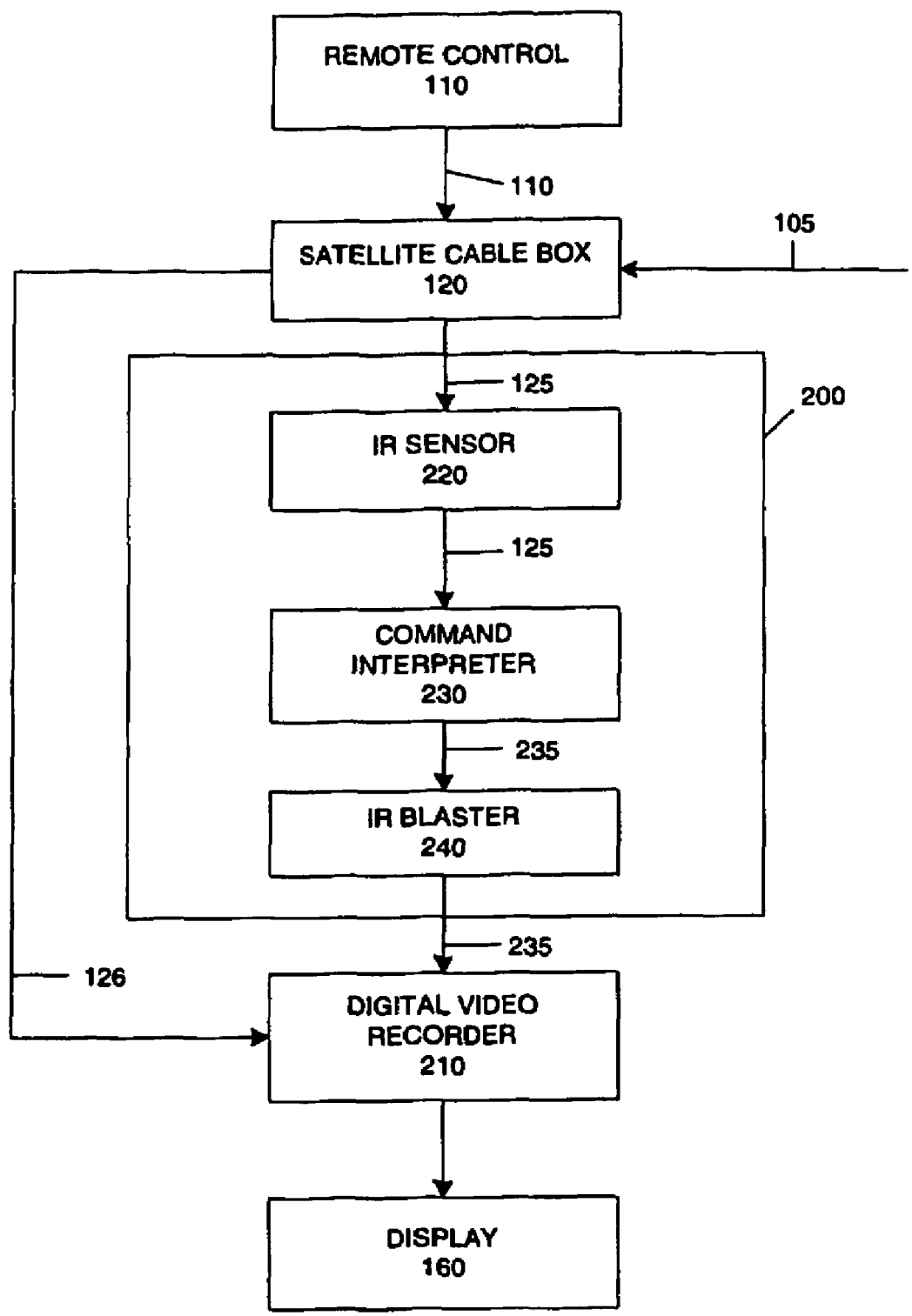
FIG. 2 is a block diagram of an apparatus according to the invention operably connected to a recorder.

SCB 120 is designed to receive both user input commands 115 from remote control 110 and a cable signal 105 from a signal source. Remote control 110 is programmed to communicate with SCB 120. Alternatively, a universal remote control can be used that will send signals directly to digital video recorder 100 or code command converter 200 (FIG. 2). A user controls satellite/cable box "(SCB") 120 by inputting choices into remote control 110 by pressing keys associated with the desired commands. Remote control 110 responds by sending an associated user input command to SCB 120 via an IR signal, an electrical connection, electromagnetic frequencies, or any other means known in the art. Remote control 110 comprises keys for controlling functions of SCB 120. SCB 120 is designed to only receive SCB-related user input commands 115 and issue VCR code commands 125. The exact function of VCR code command 125 will be dictated by the identity of the key on remote control 110 that is pressed by the user. The process of SCB 120 in converting SCB related user input command 115 into a corresponding VCR code command 125 is controlled by a properly programmed processor (not illustrated) within the SCB 120. If a universal or VCR remote control is used, VCR code commands 125 can be sent directly from the remote control to IR command sensor 130.

SCB 120 also receives cable signal 105. SCB 120 tunes to the channel specified in the user command transmitted from the remote control 110, so that the video signals from that channel are extracted. As described above, the extracted video signals are directly fed to the switch 300 of the digital recorder 100 via any known method or connection capable of transmitting data, such as IR signals or electromagnetic frequencies.

SCB 120 transmits VCR code command 125 to IR command sensor 130 of digital video recorder 100. This is preferably done via a properly linked IR blaster (not illustrated) within SCB 120. Alternatively, an electrical, electromagnetic, or other connection can be used. IR command sensor 130 receives VCR code command 125 in IR form, converts it to an electrical signal, and transmits it to command interpreter 140. However, the signal remains in VCR code format. Command interpreter 140 receives VCR code command 125 and converts it into corresponding digital recorder code command 145. Command interpreter 140 performs this conversion process by mapping an incoming VCR code command into a corresponding digital recorder code command. This mapping procedure is achieved by properly programming CPU 150 and/or software in a memory device (not illustrated) that will be executed by CPU 150. Once command interpreter 140 converts the incoming VCR code command 125 into digital recorder code command 145, digital recorder code command 145 transmits digital recorder code command 145 to CPU 150 for execution. CPU 150 then executes digital recorder code command 145 by sending proper commands to the components of digital video recorder 100 such as switch 300 and/or tuner 170 to perform digital recorder functions. For example, if digital recorder code command 145 is a one-touch record command for a specific channel, CPU 150 will send the appropriate signals to tuner 170 and the recording mechanism (not illustrated) of digital video recorder 100.

Through the use of proper programming, command interpreter 140 and CPU 150 can translate any VCR code command to any type of corresponding digital recorder code command. The present invention is not limited to the use of a command interpreter. Alternatively, CPU 150 can be programmed to perform all mapping function through proper programming. Additionally, the present invention is not limited to being embodied as a digital video recorder but can take the form of an independent interpretation apparatus operably coupled between the SCB and digital recorder.

Referring to FIG. 2, code command converter 200 is illustrated as being coupled to SCB 120 and digital video recorder 210. The functions of digital video recorder 210 operate according to digital recorder code commands. SCB 120 operates as described in relation to FIG. 1 and is designed to output VCR code commands only. Code command converter 200 comprises IR sensor 220, command interpreter 230, and IR blaster 240. All of the components of code command converter 200 are linked via a bus and controlled by a CPU (not illustrated) according to standards known in the art. IR sensor 220 receives VCR code command 125 from SCB 120 and transmits it to command interpreter 230 as described above. Command interpreter 230 maps out and converts the incoming VCR code command 125 into corresponding outgoing digital recorder code command 235. Corresponding digital recorder code command 235 is then transmitted to IR blaster 240. IR blaster 240 then transmits corresponding digital recorder code command 235 to digital recorder 210 for execution thereby.

Figure 3:
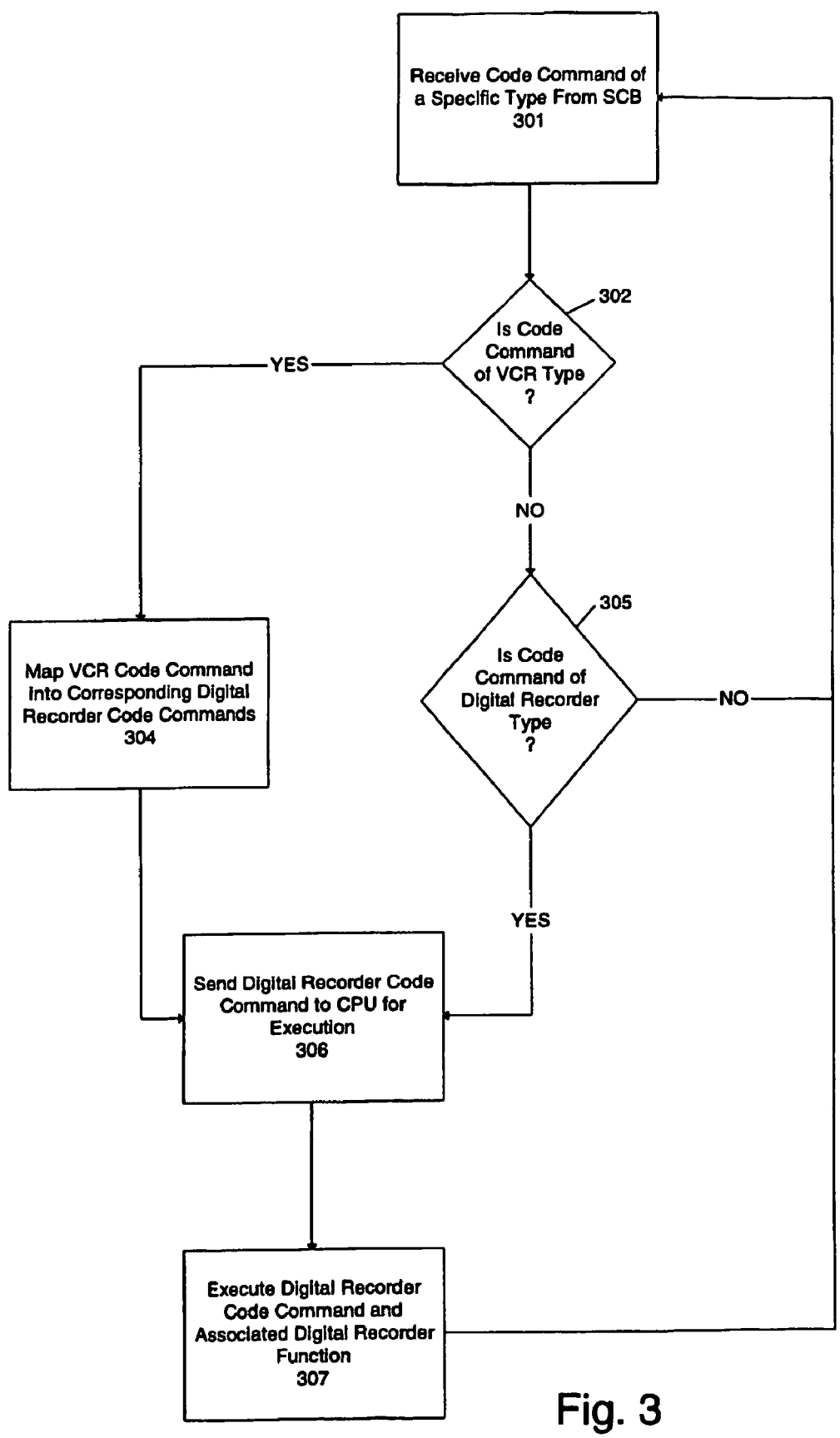
FIG. 3 a flowchart showing an embodiment of a method according to the invention.

The present invention can be used to convert/translate sets of commands simultaneously. Moreover, the apparatus of the present invention are capable of receiving both VCR code commands and digital recorder code commands. In this embodiment, the incoming code command is first evaluated to determine its type, VCR or digital recorder. Then, depending on the results of the evaluation, the decision is made whether mapping is necessary. An embodiment of this method is illustrated in FIG. 3 wherein the system receives 301 a code command of a specific type from an SCB and if 302 the code command is of the VCR type, it maps 304 the VCR code command into a corresponding Digital Recorder Code command and sends 306 the Digital Recorder Code Command to the CPU controller for execution 307 along with associated Digital Recorder Function, otherwise, if the command is not of the VCR type, then the system determines 305 if the command is of Digital Recorder type. If so, the Digital Recorder Code command is sent 306 to the CPU for execution, otherwise if not the system waits for receipt 301 of a command of a specific type from the SCB.

While the invention and preferred embodiments have been described and illustrated in sufficient detail that those skilled in this art may readily make and use the invention, various alternatives, modifications and improvements should become readily apparent to this skilled in this art without departing from the spirit and scope of the invention. For example, a DVD player according to the principles of the invention can be controlled by a VCR remote control at least for the play, the stop, the rewind, and the forward functions.

The invention claimed is:

1. An interpretation apparatus comprising:
   a receiver adapted to receive a first type of recorder command and a second type of recorder command, wherein the first type of recorder command is used to control a first type of video recorder and the second type of video recorder command is used to control a second type of recorder;
   means to map the second type of video recorder command into a corresponding first type of video recorder command; and
   means to output the corresponding first type of video recorder command.

2. The interpretation apparatus of claim 1 wherein the second type of recorder command is VCR code command.

3. The interpretation apparatus of claim 1 wherein the first type of recorder command is a digital video recorder code command.

4. The interpretation apparatus of claim 1 wherein the receiver comprises an IR sensor.

5. The interpretation apparatus of claim 1 wherein the output means comprises an IR blaster.

6. The interpretation apparatus of claim 1 wherein the mapping means is a programmed processor.

7. The interpretation apparatus of claim 1 wherein the mapping means is a command interpreter.

* * * * *